United States Patent [19]
Hess

[11] Patent Number: 4,560,125
[45] Date of Patent: Dec. 24, 1985

[54] SUPPORTING APPARATUS FOR PIPELINES SYSTEMS

[75] Inventor: Dale N. Hess, Colorado Springs, Colo.

[73] Assignee: International Telephone and Telegraph Corporation, New York, N.Y.

[21] Appl. No.: 551,541

[22] Filed: Nov. 14, 1983

[51] Int. Cl.[4] .............................................. F16L 3/16
[52] U.S. Cl. ........................................ 248/55; 248/49; 405/154
[58] Field of Search ...................... 405/154, 158, 172; 248/49, 55

[56] References Cited
U.S. PATENT DOCUMENTS

| | | | |
|---|---|---|---|
| 1,079,758 | 11/1913 | Gray | 248/55 |
| 2,002,103 | 5/1935 | Wheeler | 248/49 |
| 3,288,406 | 11/1966 | Degen | 248/49 |
| 4,128,219 | 12/1978 | Kaigler | 248/49 X |

Primary Examiner—Dennis L. Taylor
Attorney, Agent, or Firm—John T. O'Halloran; Mary C. Werner

[57] ABSTRACT

An apparatus for supporting a pipe or similar article includes a bottom skid member which has a relatively flat central bottom surface surrounded by an upwardly extending arcuate surface to form a saucer-like configuration.

Positioned on the top of the skid member and above the flat section is an extending cylindrical pedestal member. The pedestal has a central slot into which is inserted a corresponding channel. Various devices can be directly coupled to the channel such as pipe clamps for securing the pipe to the skid and pedestal structure as well as a vertical post which has secured thereto pipe clamping means for supporting the pipe at a given distance above the top surface of the pedestal.

19 Claims, 5 Drawing Figures

SUPPORTING APPARATUS FOR PIPELINES SYSTEMS

BACKGROUND OF THE INVENTION

This invention relates to a support apparatus for a pipeline and more particularly to a support apparatus for a pipeline which is adapted to move with movements of the pipe.

As is well known, pipelines are widely employed for the transport of various fluids and gases such as oil, waste material, and so on. There are many pipelines which exist throughout the world and many of which are located above ground.

In particular pipelines have been extensively employed in the Arctic regions for the transport of various fluids. As such, the pipelines in the Arctic regions are always above ground due to the obvious difficulty of maintaining such a line below ground in such adverse environmental conditions. A great deal of the pipelines consist of welded steel pipes which are supported off the ground by timber and oil drums. The purpose of the pipeline support is to minimize corrosion. Corrosion, both cathodic and chemical occurs most rapidly when the pipeline is in contact with the ground or water and hence the steel pipe must be supported above the ground as indicated.

Apart from the above factor is that the continuous expansion and contraction of the pipeline material causes considerable movement of the pipeline. In addition, the pipeline also moves due to the force of the liquid within the pipe. The movement of the pipeline creates havoc with the support mechanism and the destruction of supporting oil drums and timbers is a continuous problem.

Apart from the fracture or breakage of such supports due to the movement is the additional problem that wood and oil drum material are also not inert to the Arctic environment. Thus, timber rots, oil drums rust and freezing and thawing destroys these types of supports. A further problem is the destruction of such supports due to the high wind velocity which occurs in the Arctic regions. Based on such factors, there is a considerable amount of environmental pollution caused by the timber and oil drum pipe supports, apart from the fact that the continuous wear of such supports creates an unpleasant appearance. Hence these sites have to be continuously cleaned and repaired. It is sufficient to say that very little has been done to replace the pipe supports and thus a considerable amount of the pipelines remain lying on the ground where corrosion substantially reduces the effect of life of the system.

It is therefore an object of the present invention to provide an improved pipeline support system particularly adapted for use in the Arctic region.

It is another object of the present invention to provide an improved pipe line support system which is capable of moving with the pipe in any direction to thereby prevent destruction of the support system for typical conditions as above described.

DESCRIPTION OF THE PREFERRED EMBODIMENT

An apparatus for supporting a pipeline comprising a skid member having a bottom surface with a relatively flat central section with an arcuate outer surrounding section contiguous with said central section and sloping upwardly from said central section towards the periphery of said member to provide a concave top surface with a cylindrical support section on said top surface and extending upwardly above said central section, said support section having a closed top with a slot on said surface and support means inserted in said slot to accommodate a section of said pipeline.

DETAILED DESCRIPTION OF THE INVENTION

Figure 1:
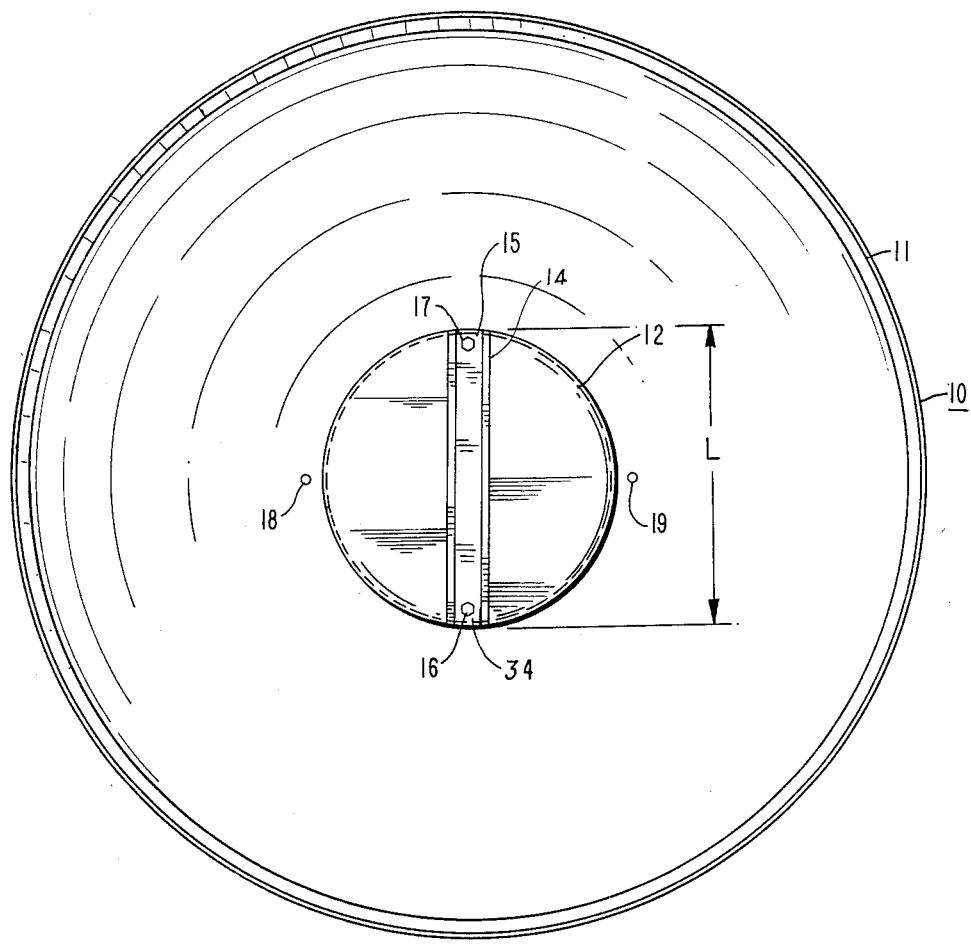
FIG. 1 is a top plan view of combined skid and pedestal arrangement employed in the pipe support system according to this invention.

Referring to FIG. 1, there is shown a top plan view of a pipe support apparatus 10 according to this invention.

Essentially, the pipe support apparatus consists of a lower skid member 11. The member 11 as seen in FIG. 1 is of a circular plan view and has an arcuate bottom edge as will be explained. The skid member 11 is of a "saucer-like" configuration. Positioned centrally on the skid member 11 is a pedestal member 12. The pedestal member 12 has a central slot 14 in which is inserted a channel member 15 of metal or other suitable material which is secured to the pedestal member by means of suitable fasteners as 16 and 17 which, for example, may be hex-head machine screws. The channel member 15 bounds a slot 34. As seen in FIG. 1, there are two apertures 18 and 19 which serve as drain holes for the skid area and are utilized to allow water to drain so that it does not accumulate within the skid area. The diameter of the pedestal section 12 is approximately 12 inches while the diameter of the skid section 11 is approximately 32 inches. Both sections are fabricated from glass fiber reinforced synthetic plastic material, commonly known as fiberglass, which is 3/16 inch thick fiberglass reinforced plastic with ultraviolet stabilizing pigment added.

This type of fiberglass construction is well known and widely employed. It is also understood that fiberglass is extremely inert and relatively light in weight and inexpensive in price. As one can understand, fiberglass is also extremely rugged and durable.

Figure 2:
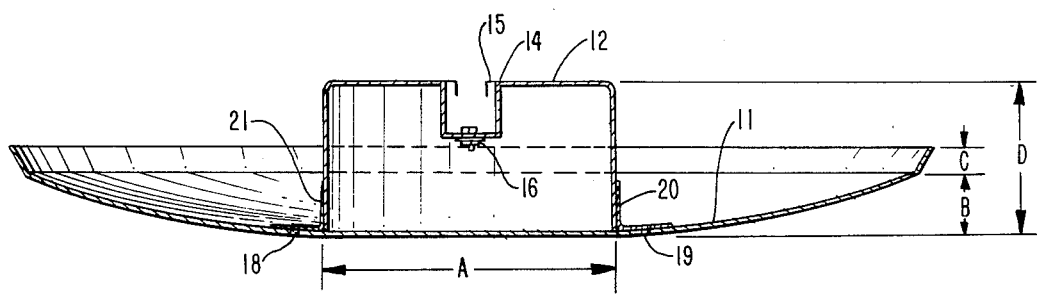
FIG. 2 is a central cross-sectional view taken through the apparatus of FIG. 1.

The slot 14, as seen in FIG. 2, is of a U-shaped cross section, while the channel member is also of a corresponding U-shaped section but has extending top flanges contiguous with downward portions to form a slot. As will be explained, into this slot is inserted a pipe clamp or a vertical support post to hold a pipeline in position.

Referring to FIG. 2, there is shown a cross-sectional view of the skid 11 with the pedestal member 12 positioned thereon. As seen in FIG. 2, the skid has a bottom surface section A which is relatively flat and above which the pedestal section is secured thereto by means of L-shaped fiberglass welds 20 and 21. The drain holes 18 and 19 are shown positioned at the weld area.

As can be seen from FIG. 2, the skid has arcuate end portions which emanate from the flat portion A to form an open concave structure which when coupled to the pedestal 12 appears as a hat or a sombrero. The pedestal is also fabricated from 3/16 inch thick fiber glass with the slot 14 containing the channel member 15 which is bolted within the slot by means of the fasteners as 16 and 17.

In regard to FIG. 2, the height designated as B on the drawing is approximately 2 inches while the height C is approximately 1 inch. The dimension D from the bottom of the skid to the top of the pedestal is 5 inches while the width of the slot 34 is 1⅝ inch with the depth of the channel being the same dimension.

Figure 3:
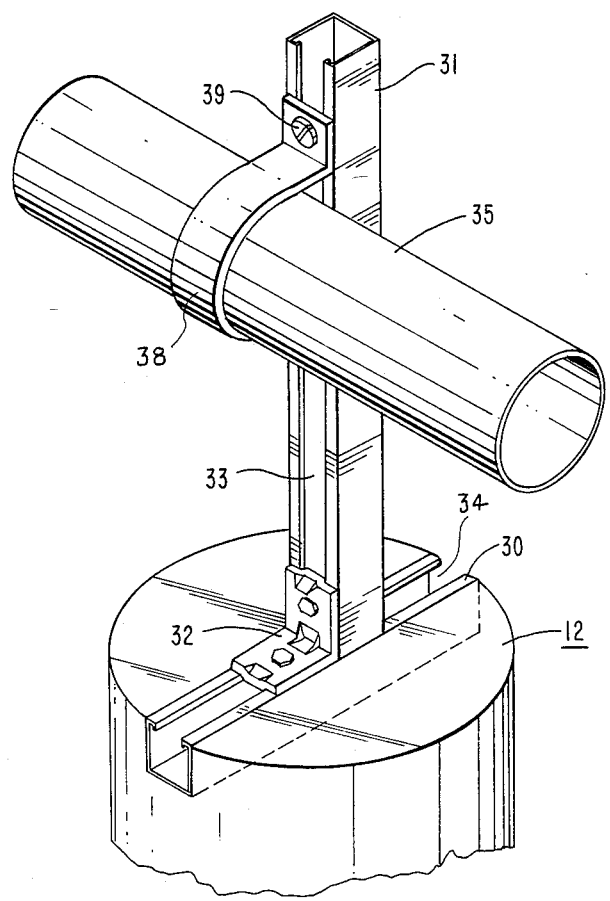
FIG. 3 is a partial perspective view of one pipe support apparatus according to this invention.

Referring to FIG. 3, there is shown one embodiment of a pipe support configuration employing the combination pedestal and skid apparatus as described in conjunction with FIGS. 1 and 2. The configuration in FIG. 3 shows a partial view of the pedestal 12 with the understanding that it is, in fact, firmly attached to the arcuate concave skid structure. The channel member, here designated as 30, is used to couple a vertical support channel member 31 thereto. The channel member 31 may be coupled to the channel member 30 by means of an L-shaped angle or bracket 32 which is secured by means of nuts, for example, wing nuts or spring nuts, within a slot 33 of the channel member 31. It is, of course, understood that there are many ways of coupling the channel member 31 to the channel member 30.

As can be ascertained from FIG. 3, the upstanding vertical channel member 31 is relatively of a square cross section having the slot 33 along one side. The channel member 31 is similar to the channel member 30 since it has a similar type of flange arrangement associated therewith. This means that the slot 33 is similar to the slot 34. The slot 33 in the vertical member 31 enables coupling of various pipe coupling devices to the apparatus which, as will be explained, enables one to couple the pipeline to the supporting mechanism as a function of the surface orientation of the terrain.

Essentially, the clamp mechanisms for retaining the pipe within the slot 33 associated with the vertical channel member 31 are conventional and consist of arcuate members which conform to the outer peripheral surface of the pipe to mount the pipe in a fixed position with relation to the vertical support member.

A section 35 of a pipeline is shown secured to the channel member 31 by means of an arcuate pipe clamp 38 which is secured to the channel at top and bottom by means of a suitable fastener identified as 39. It is understood that pipe clamps identified as 38 are available in many diameters to accommodate 2 inch, 4 inch, 6 inch and so on pipe diameters.

Figure 4:
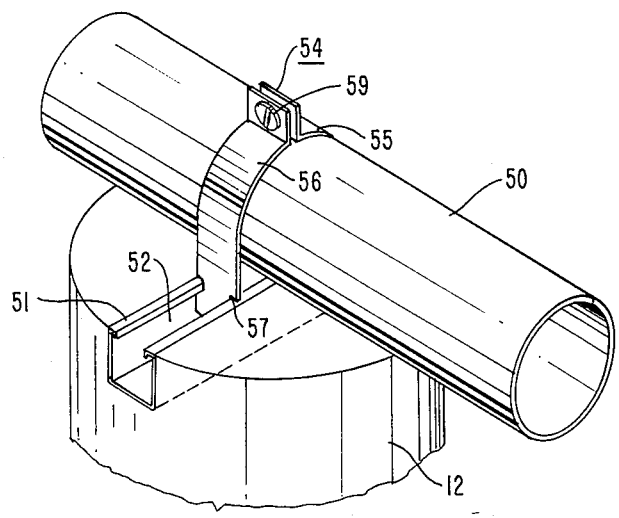
FIG. 4 is a partial perspective view of an alternate pipe support apparatus according to this invention.

Referring to FIG. 4, there is shown an alternate embodiment of coupling a pipe line 50 to the combination pedestal and strut assembly. In the configuration in FIG. 4, the central channel member here designated as 51 has a pipe 50 lying transverse to its slot 52 and secured on top of the pedestal 12 by means of a pipe clamp 54. The clamp 54 consists of a right section 55 and a left section 56 both of which have extending apertured tabs and both of which are emplaced within the slot 52 of the channel member 51 by a notched section 57. The pipe 50 is inserted between the clamp members 55 and 56 which are then secured to firmly grasp the pipe 50 by means of a fastener 59 inserted through the apertures of each clamp member 55 and 56 as located on the extending top tabs.

Figure 5:
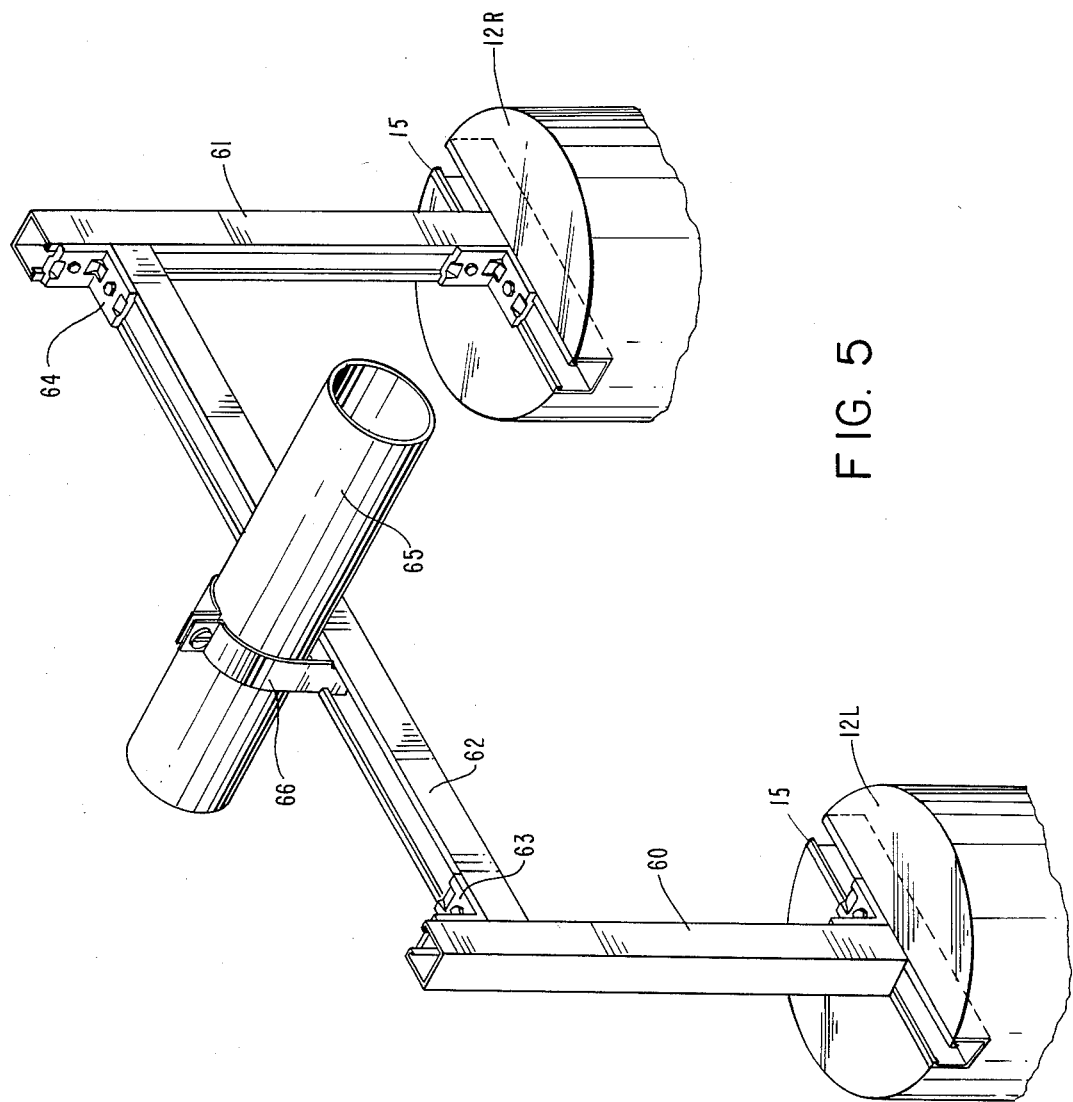
FIG. 5 is a partial perspective view of still another embodiment of a support apparatus according to this invention.

Referring to FIG. 5, there is shown still a further technique for mounting a pipeline employing right and left pedestal members, here identified as 12L and 12R. Each pedestal member 12L and 12R has coupled to the respective channel member 15 an upstanding vertical channel member, here identified as 60 and 61. Coupled between the vertical members 60 and 61 is a horizontal slotted channel member 62 which is coupled to the slots of members 60 and 61 by means of L-shaped brackets 63 and 64. A pipe identified as 65 is coupled to the horizontal channel member 62 by means of a pipe clamp 66 similar to the clamp shown in FIG. 4. It is immediately apparent that the composite skid and pedestal configuration can be employed in many different ways to accommodate the support of a pipeline for all particular problems associated with the terrain or the environment. The configuration depicted in FIGS. 3 and 4 can be utilized for straight runs while the configuration in FIG. 5 is employed to allow the pipeline to pass over obstacles on the terrain.

It is understood that the height of the vertical channel members such as 31 of FIG. 3 or 60 and 61 of FIG. 5 can be of any height required based on the particular application. The channel members may be fabricated from a metal or may also be fabricated from any other suitable material which will survive the harsh environmental conditions of use.

The material is a function of the weight of the pipeline and the particular application. The spacing of the supports may vary depending upon the size of the pipe and, for example, for a 2 inch pipe the supports consist of the skid and the pedestal arrangement may be spaced 10 feet, 14 feet apart for a 4 inch pipe and 17 feet apart for a 6 inch pipe.

In regard to the above described apparatus, it is seen that due to the unique shape of the skid, the entire pipe support will slide or move as the pipe moves. The arcuate bottom surface of the skids will allow the pipe to tilt in the vertical plane while also providing motion in the horizontal plane. Hence the entire system is capable of moving and maintaining alignment of pipeline during such movement due to the construction and nature of the skids and associated pedestals. Essentially, the saucer shaped skid provides a large supporting surface area which is capable of sliding over the ground if the pipe moves. The central channel associated with the pedestal allows one to firmly secure the slotted channel member within the same and hence to permit coupling of a wide variety of vertical supports or various clamp mechanisms. The apparatus is extremely inexpensive to fabricate while very neat in appearance and minimizes all of the above described problems which exist with prior art systems.

While the above noted system depicted and described pipes of circular configurations, it is, of course, understood that the apparatus could accommodate pipes of any geometrical cross section. According to this technique, it is also understood that while both the skid and the pedestal have been depicted as circular or cylindrical members, it is again understood that various geometric configurations could be employed without departing from the spirit and scope of the invention.

What is claimed is:

1. Apparatus for supporting a pipeline above the ground, comprising:
   a base member having a substantially flat central surface surrounded by an upwardly sloping arcuate surface;

a support section rigidly attached to and extending upwardly from said central surface of said base member and having an upper surface extending parallel to said flat central surface of said base member, said upper surface having a channel extending across it; and pipe support means rigidly coupled to said channel to support a portion of said pipeline whereby said flat central portion of said base member is free to move as the pipeline moves but does not move relative to it.

2. The apparatus according to claim 1, wherein said cross channel is a "U" shaped channel having located therein an additional channel member having a top surface slot and a pipe clamp coupled to said slot for holding a section of said pipe.

3. The apparatus according to claim 2, wherein said pipe clamp comprises right and left arcuate sections, each having a bottom section adapted to coact with and be retained within said slot with said arcuate sections meeting at the top end when a pipe is accommodated between said right and left sections and means coupled to said top ends to secure said sections together.

4. The apparatus according to claim 1, wherein said support means coupled to said channel includes a vertically extending post and means coupled to said post for holding a section of said pipeline.

5. The apparatus according to claim 4, wherein said vertically extending post has a vertical slot in one side thereof, with a pipe clamp coupled to said slot.

6. The apparatus according to claim 1, wherein said base member and said support section are fabricated from fiber glass.

7. The apparatus according to claim 1, further including drainage apertures located on the surface of said base member.

8. Apparatus for supporting a pipeline above the ground comprising:

first and second base members separated one from the other each comprising a "saucer-like" bottom section having a closed top cylindrical pedestal section extending from the central area, first and second vertical posts each one extending from an associated pedestal section of said base members, horizontal cross member coupled between said vertical posts and a pipe clamp coupled to said horizontal cross member for supporting a section of said pipeline.

9. The apparatus according to claim 8, wherein each of said pedestal sections has an extending surface channel with said associated vertical post coupled to said channel.

10. Apparatus for supporting a pipeline comprising:

a skid member having a bottom surface with a relatively flat central section with an arcuate outer surrounding section contiguous with said central section and sloping upwardly from said central section towards the periphery of said member to provide a concave top surface, with a support section originally connected to said top surface and extending upwardly above said central section, said support section having a top surface with a slot on said surface and support means inserted in said slot and rigidly connected thereto in order to permit movement of said skid member jointly with a portion of the pipeline accommodated in said support means.

11. The apparatus for supporting a pipeline according to claim 10, wherein said skid member is of a circular planar configuration with a flat bottom surface section having an outer curved peripheral section emanating therefrom and sloping upwardly from the bottom surface to form a "saucer-like" structure, with said cylindrical support section being positioned above said flat bottom surface section on the top of said skid member and surrounded by the periperal edge of said saucer.

12. The apparatus for supporting a pipeline according to claim 10, wherein said slot is directed from one end of said top surface to the other.

13. The apparatus for supporting a pipeline according to claim 12, wherein said support means includes a "U" shaped channel inserted within said slot and at least one vertical post member coupled to and extending from said channel.

14. The apparatus for supporting a pipeline according to claim 13, wherein said vertical post member comprises a hollow tubular member of a square cross section having a longitudinal slot along one surface and a pipe clamp secured to said slot.

15. The apparatus for supporting a pipeline according to claim 10, wherein said support means inserted into said slot comprises a pipe clamp.

16. The apparatus for supporting a pipeline according to claim 15, wherein said pipe clamp includes a right and a left arcuate section each having a bottom portion adapted to be inserted into said slot with abutting top portions for coupling said sections together.

17. The apparatus for supporting a pipeline according to claim 10, wherein said skid member and said support section are fabricated from fiber glass.

18. The apparatus for supporting a pipeline according to claim 10, wherein said skid member and said support section are welded together by means of an "L" shaped weld located about the periphery of said support section as contacting said skid member.

19. The apparatus for supporting a pipeline according to claim 10, further including drainage apertures located on the surface of said skid member.

* * * * *